(12) United States Patent
Perez et al.

(10) Patent No.: US 8,075,012 B1
(45) Date of Patent: Dec. 13, 2011

(54) TOWING DEVICE FOR MOTORCYCLES

(76) Inventors: Jose A. Perez, Miami, FL (US); Rosa B. Garcia, Miami, FL (US)

( * ) Notice: Subject to any disclaimer, the term of this patent is extended or adjusted under 35 U.S.C. 154(b) by 99 days.

(21) Appl. No.: 12/608,931

(22) Filed: Oct. 29, 2009

(51) Int. Cl.
*B62D 43/02* (2006.01)
(52) U.S. Cl. .................. 280/402; 414/462; 414/463
(58) Field of Classification Search ............ 280/402; 414/462, 463
See application file for complete search history.

(56) References Cited

U.S. PATENT DOCUMENTS

| | | | | |
|---|---|---|---|---|
| 3,430,983 A * | 3/1969 | Jones | | 280/402 |
| 3,822,898 A * | 7/1974 | Brownlie | | 280/402 |
| 3,979,137 A * | 9/1976 | Lipscomb et al. | | 280/402 |
| 5,145,308 A * | 9/1992 | Vaughn et al. | | 414/462 |
| 5,620,197 A * | 4/1997 | Howes | | 280/402 |
| 5,674,044 A * | 10/1997 | Ranes | | 414/563 |
| 5,906,386 A * | 5/1999 | Baker et al. | | 280/404 |
| 7,188,856 B2 * | 3/2007 | Maynard | | 280/402 |
| D584,195 S | 1/2009 | Collier et al. | | |
| 2007/0024024 A1 * | 2/2007 | Maynard | | 280/402 |

OTHER PUBLICATIONS www.sportutilitytrailers.com; Motorcycle Towing Cradle; as of Oct. 29, 2009; internet.

* cited by examiner

*Primary Examiner* — Joanne Silbermann
*Assistant Examiner* — Michael Stabley

(57) ABSTRACT

A towing device for towing a motorcycle comprising a base having a first end that slides horizontally into a receiver hitch of the vehicle; a platform extending outwardly from a second end of the base; an arc-shaped cradle for cradling a front wheel of the motorcycle; the cradle is divided into a front portion attached atop the platform and a ramp pivotally attached to the front portion of the cradle via a hinge, the ramp'can pivot to an up position and a down position, wherein the down position allows the front wheel of the motorcycle to be rolled into the front portion of the cradle, the ramp can be secured in the up position via a securing means; and a side support component extending upwardly from the platform, the side support component functions to support the front wheel of the motorcycle when in the cradle.

2 Claims, 3 Drawing Sheets

TOWING DEVICE FOR MOTORCYCLES

FIELD OF THE INVENTION

The present invention is directed to a hitch or towing device, more particularly to a device for towing a motorcycle behind a vehicle wherein the rear wheel of the motorcycle can spin freely on the pavement during transport.

BACKGROUND OF THE INVENTION

A variety of motorcycle towing devices have been designed previously. The present invention features a novel towing device for motorcycles. The towing device of the present invention is compact and very easy to use.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
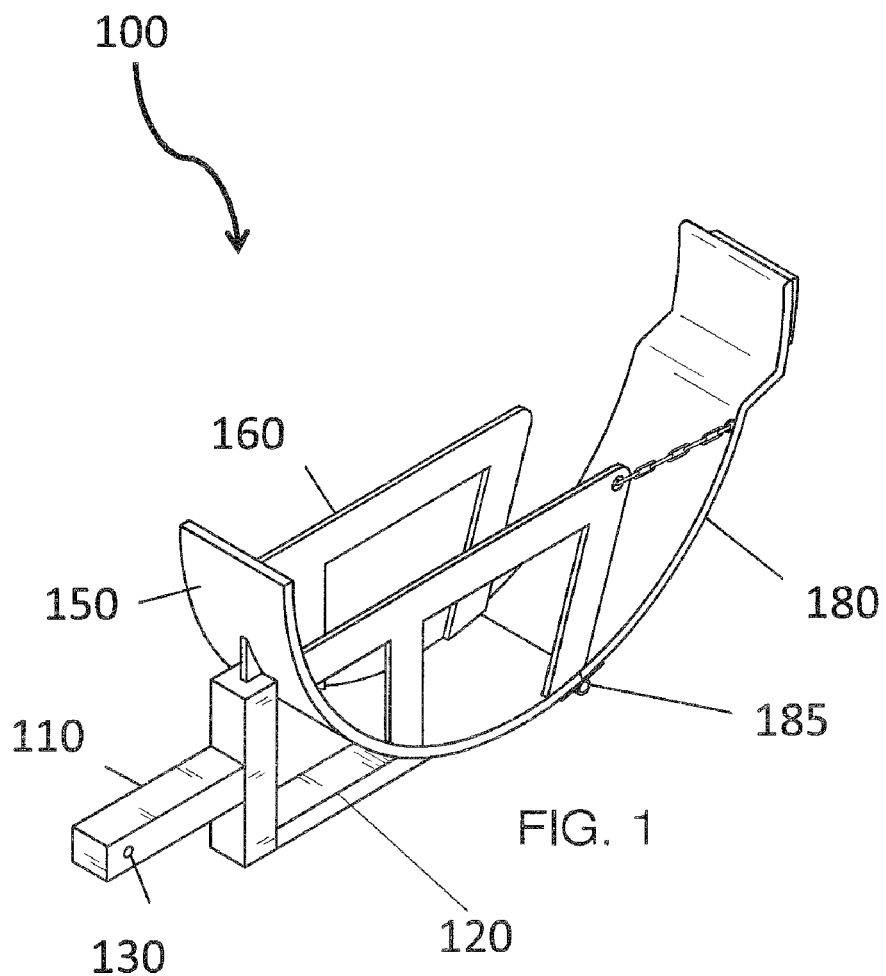
FIG. 1 is a perspective view of the towing device of the present invention.
Figure 2:
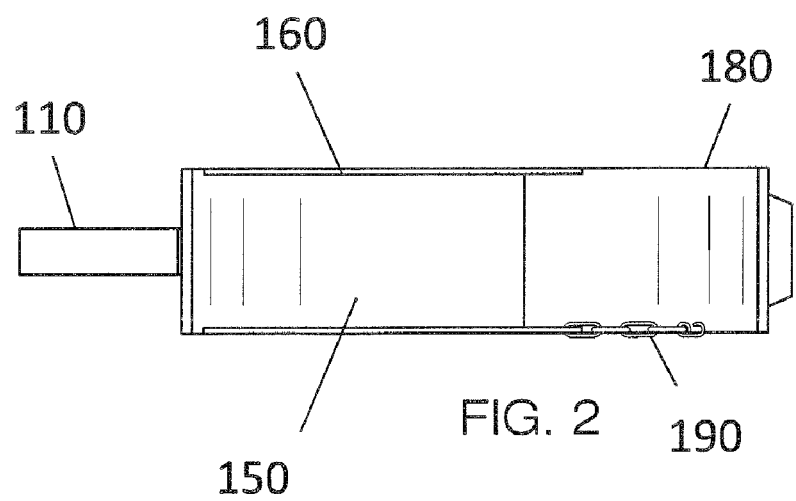
FIG. 2 is a top view of the towing device of FIG. 1.

Referring now to FIGS. 1-5, the present invention features a towing device 100 for towing a motorcycle 101 behind a vehicle 105 (e.g., car, truck, etc.). The towing device 100 of the present invention cradles and supports the front wheel 102 of the motorcycle 101 while the rear wheel can spin freely on the ground. Without wishing to limit the present invention to any theory or mechanism, it is believed that the towing device 100 of the present invention is advantageous because an additional specialized trailer or a pickup bed is not required to tow a motorcycle 100 the device 100 of the present invention.

The towing device 100 comprises a base 110 for installing/attaching in a receiver hitch 108 of the towing vehicle 105. Such receiver hitches are well known to one of ordinary skill in the art. The base 110 may be a tubular (e.g., square) base having a first end that slides horizontally into the receiver hitch 108. One or more holes 130 are disposed in the base 110 (e.g., at or near the first end) that can be aligned with the holes in the receiver hitch 108. The base 110 can be stabilized and secured within the receiver hitch 108 via a locking pin. Locking pins and means of attaching devices to a receiver hitch 108 are well known to one of ordinary skill in the art.

Attached to the second end of the base 110 is a platform 120. The platform 120 may be attached via an attachment means (e.g., welding, bolts 125, etc.). The platform 120 is generally flat and elongated. The platform 120 extends outwardly from the base 110 and is for supporting a cradle 150. The cradle 150 is generally semi-circular or arc-shaped. The cradle 150 is for cradling the front wheel 102 of the motorcycle 101.

Figure 3:
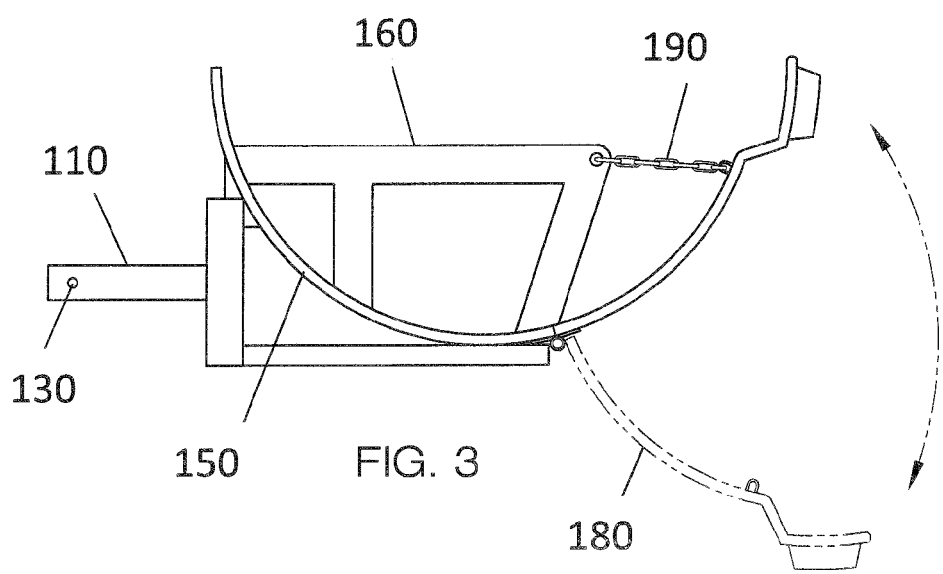
FIG. 3 is a side view of the towing device of FIG. 1.
Figure 4:
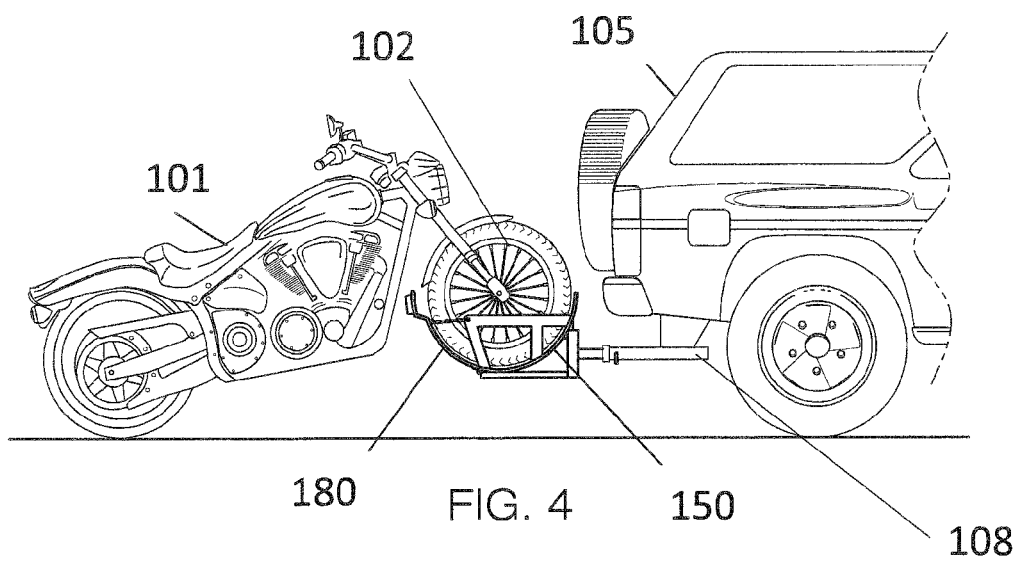
FIG. 4 is a side view of the towing device of FIG. 1, wherein the device is attached to a towing vehicle.
Figure 5:
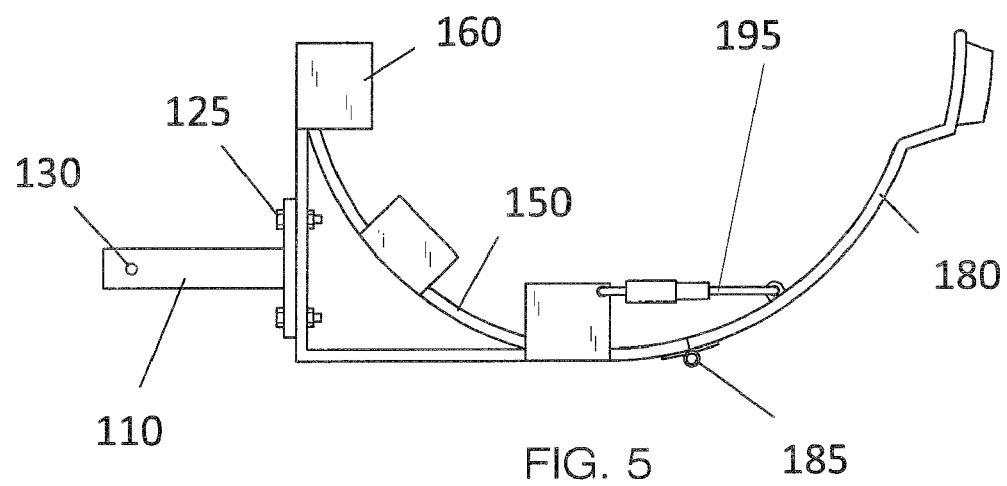
FIG. 5 is a side view of an alternative embodiment of the towing device of the present invention.

In some embodiments, a side support component 160 is attached to the platform 120 (e.g., on a first side edge and/or a second side edge) and extends upwardly and generally perpendicularly from the platform 120. The side support component 160 may be used to support the front wheel 102 of the motorcycle 101 when the wheel 102 is in the cradle 150. For example, the support component 160 can help prevent the motorcycle 101 from tipping to one side or the other. FIG. 3 and FIG. 5 show examples of different types of side support components 160.

The cradle 150 may be divided into a front portion that is fixedly attached to the platform 120 and a ramp 180. The ramp 180 may be pivotally attached to the front portion via a hinge 185. The ramp 180 can pivot upwardly and downwardly with respect to the front portion and/or the platform 120. The ramp 180 can be moved to the down position to allow the front wheel 102 of the motorcycle to be rolled up the ramp 180 and into the front portion of the cradle 150. The ramp 180 can be secured in the up position via a securing means. In some embodiments, the securing means includes a chain 190. A chain 190 may be attachable to the ramp 180 and another component of the device 100 such as a side support component 160 to secure the ramp 180 in the up position. In some embodiments, the securing means includes a hooking mechanism 195 (see FIG. 5), for example a hook connects the ramp 180 to a portion of a side support component 160.

The present invention also features a method of towing a motorcycle. The method comprises obtaining a towing device 100 of the present invention. To tow a motorcycle 101, a user can first engage the base 110 with the receiver hitch 108 of the vehicle 105. Next, the user can lower the ramp 180 and put the front wheel 102 of the motorcycle 101 into the cradle 150. The user can raise the ramp 180 and secure the ramp 180 in the up position with a chain 190 and/or a strap. The user can optionally use additional chains and/or straps to secure the motorcycle 101. The transmission of the motorcycle 101 may then be put in neutral and the motorcycle 101 towed behind the vehicle 105.

Without wishing to limit the present invention to any theory or mechanism it is believed that the towing device 100 of the present invention is advantageous because its design and the small number of parts makes it extremely easy to use. The towing device 100 of the present invention does not require a great deal of effort to mount the motorcycle, nor does it require a great deal of effort further securing the motorcycle once it's in the towing device 100. Further, the ramp can pivot upwardly to an up position and downwardly to a down position with respect to the front portion. In the down position allows the front wheel of the motorcycle to be rolled up the ramp and into the front portion of the cradle, wherein the ramp can be secured in the up position via a securing means where the ramp continues and completes the arc-shaped cradle to further provide a snug fit for the motorcycle tire.

The towing device 100 of the present invention may be constructed from a variety of materials. In some embodiments, the towing device is constructed from a material comprising metal (e.g., steel).

The following the disclosures of the following U.S. patents are incorporated in their entirety by reference herein: U.S. Pat. No. 5,145,308; U.S. Pat. No. 5,674,044; U.S. Pat. No. 3,822,898; U.S. Pat. No. 5,620,197; U.S. Pat. No. 7,188,856.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A towing device for towing a motorcycle behind a vehicle, said towing device comprising:
    (a) a generally tubular base having a first end that slides horizontally into a receiver hitch of the vehicle, wherein a hole is disposed in the base for aligning with a hole in the receiver hitch, the base can be secured in the receiver hitch via a locking pin that simultaneously engages both the hole in the base and the hole in the receiver hitch;
    (b) a generally flat and elongated platform extending outwardly from a second end of the base;
    (c) an arc-shaped cradle for cradling a front wheel of the motorcycle, the cradle is divided into:
        (i) a front portion fixedly attached atop the platform; and
        (ii) a ramp pivotally attached to the front portion of the cradle via a hinge;
    wherein the ramp can pivot upwardly to an up position and downwardly to a down position with respect to the front portion, wherein the down position allows the front wheel of the motorcycle to be rolled up the ramp and into the front portion of the cradle, wherein the ramp can be secured in the up position via a securing means where the ramp continues and completes the arc-shaped cradle to further provide a snug lit for the motorcycle tire;
    (d) a side support component extending upwardly and generally perpendicularly from a first side edge of the platform, the side support component functions to support the front wheel of the motorcycle when the front wheel is in the cradle;
wherein the securing means is a chain attachable to the ramp and a component of the towing device; wherein the component of the towing device is the side support component.

2. A towing device for towing a motorcycle behind a vehicle, said towing device comprising:
    (a) a generally tubular base having a first end that slides horizontally into a receiver hitch of the vehicle, wherein a hole is disposed in the base for aligning with a hole in the receiver hitch, the base can be secured in the receiver hitch via a locking pin that simultaneously engages both the hole in the base and the hole in the receiver hitch;
    (b) a generally flat and elongated platform extending outwardly from a second end of the base;
    (c) an arc-shaped cradle for cradling a front wheel of the motorcycle, the cradle is divided into:
        (i) a front portion fixedly attached atop the platform; and
        (ii) a ramp pivotally attached to the front portion of the cradle via a hinge;
    wherein the ramp can pivot upwardly to an up position and downwardly to a down position with respect to the front portion, wherein the down position allows the front wheel of the motorcycle to be rolled up the ramp and into the front portion of the cradle, wherein the ramp can be secured in the up position via a securing means where the ramp continues and completes the arc-shaped cradle to further provide a snug fit for the motorcycle tire;
    (d) a side support component extending upwardly and generally perpendicularly from a first side edge of the platform, the side support component functions to support the front wheel of the motorcycle when the front wheel is in the cradle;
wherein the securing means is a hook connecting the ramp to the side support component.

* * * * *